United States Patent [19]
Naderi

[11] Patent Number: 4,855,709
[45] Date of Patent: Aug. 8, 1989

[54] SYSTEM OF ALARM TO MAKE AWARE ABOUT BAD CONDITION OF CAR

[76] Inventor: Mohammad T. Naderi, Isabellaland 896, ST The Hague, Netherlands

[21] Appl. No.: 708,529

[22] Filed: Jun. 17, 1985

[51] Int. Cl.[4] ............................................. B60Q 1/00
[52] U.S. Cl. .................................. 340/438; 340/450; 340/525; 340/457.3; 340/459
[58] Field of Search .................. 340/52 F, 52 D, 525; 200/61–87; 307/10 LS, 10 AT

[56] References Cited

U.S. PATENT DOCUMENTS

| | | | |
|---|---|---|---|
| 3,815,110 | 6/1974 | Davidson | 340/52 D |
| 3,903,513 | 9/1975 | Green et al. | 340/52 D |
| 4,361,826 | 11/1982 | Catala | 340/52 F |
| 4,495,484 | 1/1985 | Kawakatsu et al. | 340/52 F |

*Primary Examiner*—Donnie L. Crosland

[57] ABSTRACT

An electrical alarm system is provided for automobiles for warning about defective conditions or malfunctions. The system includes electrical circuits, including switches responsive to certain conditions in the automobile, such as when the parking brake is down, the seat belt is off, the tire pressure is low, the water level in the radiator is low, etc., when the vehicle is moving and electricity flows through the circuit. A diode in each circuit isolates that circuit from the other circuit and an alarm in each circuit is activated by the switch to give audible signal of the undesired condition.

4 Claims, 2 Drawing Sheets

SYSTEM OF ALARM TO MAKE AWARE ABOUT BAD CONDITION OF CAR

FIELD OF THE INVENTION

This invention relates to alarm system for motor vehicles and is particularly related to an electrical alarm system for warning the operator of a motor vehicle of the condition of parts of the vehicle such as if the vehicle is moving with the parking brake on, or the driver's seat belt is off.

BACKGROUND OF THE INVENTION

In an automobile it is common to provide visible alarms as red lamps for warning the driver of defective conditions of the car as when the temperature of the radiator is high or if the engine is empty of oil. In an automobile circuit, it is also common to provide a buzzer or an alarm to warn the driver when he opens the door with the ignition in the "on" position, or in some instances even if the key remains in the ignition lock, or when the parking lights, or the main headlights, or radio, or other accessory devices in the automobile is energized when the vehicle is left unattended.

In other environments, particularly in automotive vehicles, alarm systems have been utilized to warn the driver that the vehicle is being left in an unsafe condition. For example, U.S. Pat. No. 3,723,968 discloses an alarm circuit for an automobile which sounds an alarm if both the parking brake is off and the driver's seat belt is not on.

Although these prior devices are useful, they do not warn the driver of several important and dangerous situations. For example, the visible alarm is not always effective because the driver must look at the road and sometimes encounter the danger before he becomes aware of the bad condition of the car. This system of alarm is not developed to warn of the danger as when the driver is driving and the parking brake is on, or the radiator does not contain enough water, or the tire does not contain enough air, or the belt of the engine is snapped, or the generator of the car does not create electricity. Therefore, it is necessary to have the kind of alarm which timely warns the driver about any defective conditions of the vehicle. Some of these alarms relate to a circuit which will warn the driver that one or more accessory devices are energized when the ignition has been switched to the "off" position.

SUMMARY OF THE INVENTION

By providing an alarm system according to the present invention, the driver becomes aware of the defective condition of the car, when he is sitting in the car, leaving the car or driving the car. For example, when the engine of the car is turned off but the parking brake of the car is not applied, and the belt of the engine is snapped, or for other reasons the generator of the car does not create electricity, or when the car is moving but the parking brake is not pressed down, or a door of the car is open, or the seat belt of the driver is not fastened, or when the radiator of the car does not contain enough water, or other parts of the car which should be full of oil or water do not contain enough oil or water, or the tires do not contain enough air, in all of these occasions, the alarm sounds and makes the driver aware of the malfunction in the car.

The alarm system comprises electrical circuits, with normally open and normally closed switches provided in such a way that in case some parts of the car are in defective condition, the switches will be placed in the "on" position, and by flow of electricity in the circuit, the alarm sounds to indicate an undesired condition.

DESCRIPTION OF THE PREFERRED EMBODIMENTS

Figure 1:
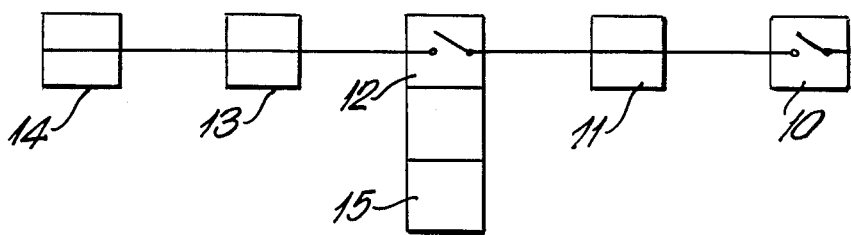
FIG. 1 shows electrical circuit No. 1 when electricity does not circulate in the circuit and the alarm does not sound.
Figure 2:
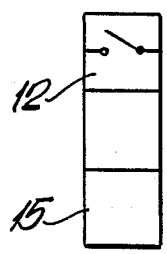
FIG. 2 shows an induced magnetic switch in the "off" position.
Figure 3:
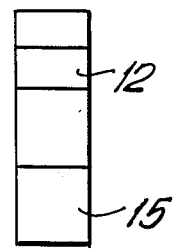
FIG. 3 shows an induced magnetic switch in the "on" position.

Referring first to FIG. 1 of the drawings, there is shown an electrical circuit No. 1 which is operative to indicate whether the parking brake of an automobile is in the "on" or "off" position. This circuit comprises an ordinary buzzer 10 and a diode 11 which serves to isolate circuit No. 1 from other circuits used in the automobile for signifying other conditions. This circuit further includes a normally closed induced magnetic switch 12 and a normally open switch which is placed under the parking brake 13 of the automobile. When the parking brake is down, the pressure exerted on switch 12 will close this switch as well as the battery 14 of the car 15. The magnetic switch 12 is connected to a generator of the car 15 of the automobile and is made so that when the generator is generating electricity, the switch 12 is in the "off" position and when no electricity is being generated, the switch 12 is in the "on" position. FIGS. 2 and 3 of the drawings illustrate the "on" and "off" positions of the magnetic switch 12 when the generator produces electricity (FIG. 2) and when no electricity is produced (FIG. 3). The details of the magnetic switch 12 are shown in FIGS. 4–6.

Figure 4:
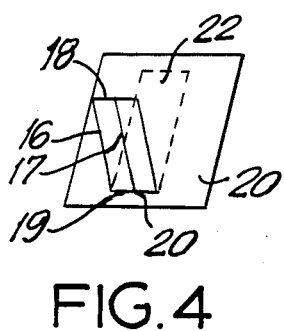
FIG. 4 shows;, in more detail, the induced magnetic switch used in the circuits of FIG. 1–3.

Referring now to FIG. 4, the magnetic switch 12 as shown comprises a smaller rectangular plate 16 which is electrically non-conductive except through the wire 17.

The plate 16 has two sides; a magnetically-sensitive side 18 and another side 19 which is hinged to a larger plate 20 as shown in FIG. 4. Both the side 19 of plate 16 and the plate 20 are non-magnetic and hence the non-magnetic side 19 is free to move the plate 16 to go up and down. The wire 17 is connected to the plate 16 at 21 and a similar connection point for the other end of the wire is provided in plate 20 as shown at 22. These two connecting points 21 and 22 facilitate placing the magnetic switch 12 in electrical circuit No. 1 so that when the free side 19 of the plate 16 is on the plate 20, electrical current will flow through this circuit.

Figure 5:
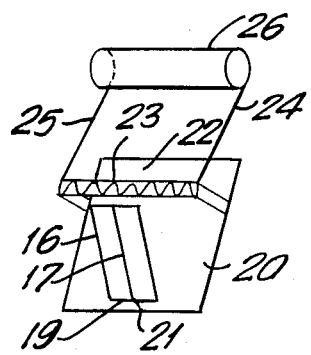
FIG. 5 shows the details of induced magnetic switch in the "off" position.
Figure 6:
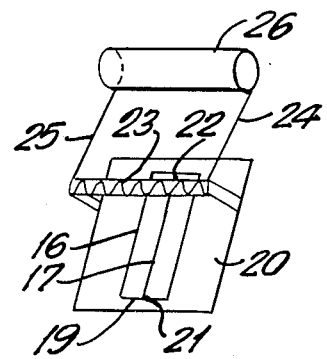
FIG. 6 shows the details of induced magnetic switch in the "on" position.
Figure 7:
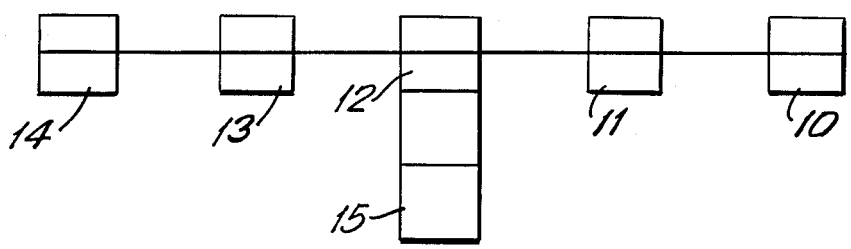
FIG. 7 shows electrical circuit No. 1 when electricity circulates on the circuit and as the result the alarm sounds.

Referring to FIG. 5, there is shown a magnetic coil 23 and resistor wires 24 and 25 which can be connected to the generator 26 of an automobile. Thus, when electricity is being produced by the generator, a magnetic field will be induced in the magnetic coil 23 causing the free side 19 of the plate 18 to be pulled up, thus interrupting electrical current flow in circuit No. 1. On the other hand, when the generator is not producing electricity, there is no magnetic field in the magnetic coil 23, consequently, the free side of rectangular plate 16 will fall down on the larger plate 20 and electricity will flow through circuit No. 1 as shown in FIG. 6. So, if the generator of the automobile is producing electricity, the magnetic switch is in the "off" position and the parking brake is down, the alarm (shown in FIG. 1) will not sound. But if the generator, for any reason, is not producing electricity, the magnetic switch is in the "on" position and the parking brake is down, the alarm will sound (see FIG. 7). Thus, when the engine of the vehicle is turned off and the driver has forgotten to engage the brakes, the alarm will sound indicating that the parking brakes are down. Also, when the engine is running but the generator is not producing electricity (such as when the engine belt is snapped) and the parking brake is down, the alarm will sound as shown by the circuit in FIG. 7.

Figure 8:
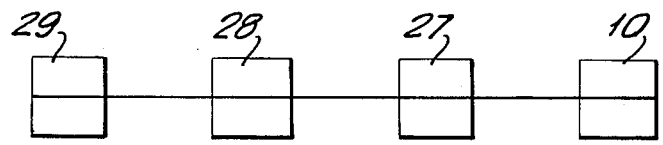
FIG. 8 shows electrical circuit No. 2 when electricity circulates in the circuit and as the result the alarm sounds.
Figure 9:
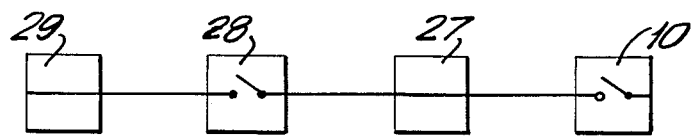
FIG. 9 shows electrical circuit No. 2 when electricity does not circulate in the circuit and as a result the alarm does not sound.

Another embodiment of the invention and the application of the principles discussed in connection with FIGS. 1–7 are shown in FIGS. 8 and 9 of the drawings illustrating electrical circuit No. 2 used to indicate the condition of a tire, the door of the vehicle or the seat belt. Referring to FIG. 8, there is shown an alarm or buzzer 10, a diode 27 which serves to isolate this circuit from the other circuits in the vehicle, and a normally closed switch 28 placed under the brake of the vehicle. When this brake is down, the pressure exerted on the switch 28 will maintain this switch in the "off" position but when the parking brake is pulled up the switch 28 will assume the "on" position. A generator 29 is placed near the tire of the vehicle and is connected thereto so that as the tire turns, the generator will also turn thus producing electricity. Therefore, as the vehicle moves and the brake is pulled up, the alarm will sound as shown in FIG. 8. However, if the brake is not applied, the alarm will not sound (see FIG. 9). If desired, the generator can be made to turn like a tachometer.

The electrical circuit described in FIGS. 8 and 9 can be connected to switches provided in the door of the vehicle, or to the belt of the driver, in such a way that when the door of the vehicle is opened, or the seat belt is disengaged, the respective switches will be in the "on" position. Consequently, when the vehicle is moving while any of its doors are open, or the seat belt is not fastened, the alarm will sound signifying such conditions. However, if the parking brake is down and all doors are shut, or the seat belt is on, then the alarm does not sound, as illustrated in FIG. 9.

Also, the generator 29 in circuit No. 2 may be connected to the battery 14 of a vehicle 15, as discussed in relation to FIG. 1, such that the electricity produced by generator 29 is transferred to the battery.

Figure 10:
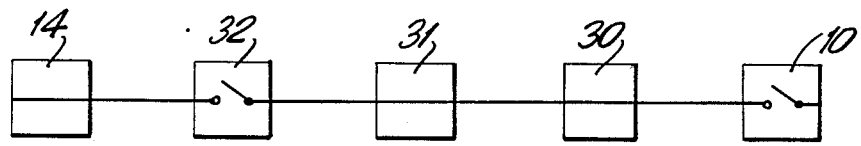
FIG. 10 shows electrical circuit No. 3 when electricity does not circulate in the circuit and as a result the alarm does not sound.
Figure 11:
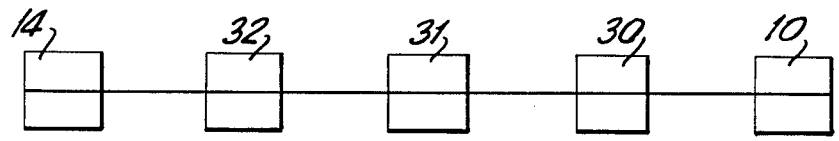
FIG. 11 shows electrical circuit No. 3 when electricity circulates in the circuit and as a result the alarm does not sound.

Still another embodiment of this invention is illustrated in FIGS. 10 and 11 for use in indicating the conditions of a radiator in an automobile. As shown in these figures, illustrating electrical circuit No. 3, this circuit comprises an alarm or buzzer 10, a diode 30 which serves to isolate this circuit from other circuits, ignition control switch 31 and a normally closed switch 32 for the radiator connected to the battery 14 of the automobile. The switch 32 is connected to the upper part of the radiator such that when the radiator is full with water, the switch 32 is in the "on" position and hence the alarm will not sound (see FIG. 10). However, when the radiator does not contain sufficient water, the switch 32 is in the "on" position and the ignition switch 31 is also in the "on" position, the alarm will sound as illustrated in FIG. 11.

Figure 12:
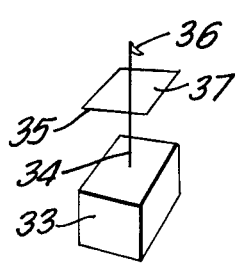
FIG. 12 shows a switch used in conjunction with the radiator of a vehicle.

The switch 32 used with the radiator 32 is shown in FIG. 12. This switch comprises an air chamber 33 which floats on water in the radiator, and electrically non-conductive bar 34 which has one end fixed to the top of the chamber 33 and which could freely go up and down through the electrically non-conductive plate 35. Two electrically conductive wires 36 and 37 are connected each to the top of the bar 34 and to the plate 37 as shown in FIG. 12. Thus, the switch 32 is placed in the electrical circuit No. 3 and when the water level in the radiator falls sufficiently, the wires 36 and 37 will contact each other and electricity will flow in the circuit thus causing the alarm to sound. The plate 35 is fixed to the top of the radiator in such a way that the air chamber 33 is placed within the radiator and the wires 36 and 37 are outside the radiator. Therefore, when the radiator contains enough water, the air chamber 33 goes up, no electricity circulates in the circuit and the alarm does not sound (FIG. 10). But, when the water level falls off so that there is insufficient water in the radiator, the air chamber comes down, electricity flows in circuit No. 3 and the alarm sounds as illustrated in FIG. 11.

Figure 13:
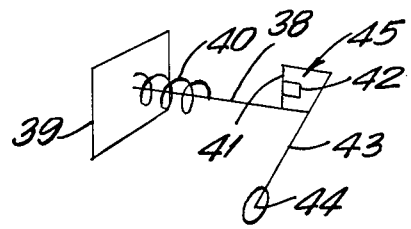
FIG. 13 shows the switch used in conjunction with the tire of a vehicle.

FIG. 13 illustrates, schematically, a switch arrangement used for indicating the condition of a tire in a vehicle. The switch comprises a horizontal bar 38 having an end which is rotatably fixed to a plate 39. Coil 40 is wound about the horizontal bar 38 with one end fixed to the plate 39 and the other end to the horizontal bar 38. A vertical bar 41 is attached to the other end of the horizontal bar 38 and a normally open switch 42 is connected to the bar 41. At the end of the bar 38 is hinged a slanted vertical bar 43 having a relatively small wheel 44 fixed at its free end as shown in FIG. 13. The wheel 44 is adapted to be connected to the tire of a vehicle and turns rapidly as the tire rotates. When the end of the slanted bar 43 is near the vertical bar 41, the switch will be in the "on" position. At the top of the vertical bar 44 is fixed a denticulated spring 45 such that when the end of the slant vertical bar 43 is near the vertical bar 41, the switch 42 will be placed in a continuous "on" position. The slant bar 43 can be released from the spring 45 by hand to place the switch 42 in the "off" position. The plate 39 is fixed in such a way that the wheel 44 is placed near the lower inside part of the tire distant from the ground so that when the tire loses air, and its horizontal diameter is increased, the lower end of the tire will press the wheel 44 of the slant vertical bar 43 and the other side of the slant vertical bar 43 nears the vertical bar 41, is placed in denticulated spring 45 and the switch 42 will thus be placed in the "on" position. The switch is placed in a safe case and will be fixed in a safe place in the bottom part of the car near the tire such that when the wheel goes up and comes down on the road, the switch also rises and comes down without changing its distance to the ground.

Figure 14:
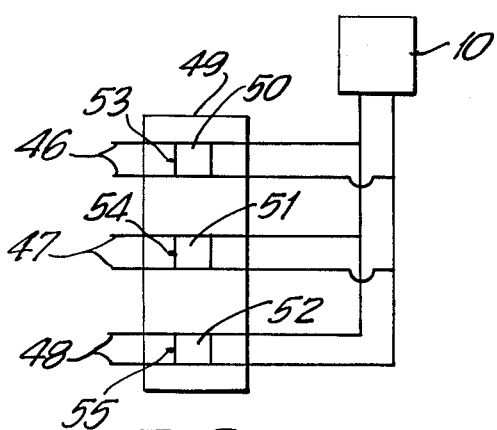
FIG. 14 shows the alarm circuits board of the vehicle.

FIG. 14 illustrates an alarm indicating board 49 for the alarm 10 and the electrical circuitries Nos. 1-3. The electrical system in FIG. 14 comprises an alarm 10 and electrical circuit No. 46, associated with circuit No. 1; electrical circuit No. 47, associated with circuit No. 2 and electrical circuit No. 48, associated with circuit No. 48. Each circuit is responsive to a malfunction in the vehicle so that when part of the vehicle is not in the proper state, electrical current flows through the corresponding circuit and the respective lamps 50, 51 or 52 will illuminate on the board 49. Each of the lamps 50, 51 and 52 has a corresponding switch 53, 54 and 55, each switch being responsive to the condition in the vehicle which is being monitored. Thus, when the alarm sounds, the driver can stop the vehicle, check the board 49 and determine which part is in state of malfunction.

What is claimed is:

1. An alarm system for indicating malfunctions in a vehicle, said system comprising at least one of the following electrical circuits:

(a) a first electrical circuit indicative of whether the parking brake is engaged or disengaged, said first electrical circuit being connected to the generator of the vehicle, and includes a switch operable by the parking brake, wherein the alarm is activated when current does not flow through the electrical circuit when the parking brake is disengaged, (b) a second electrical circuit indicative of the state of the brake connected to an alarm and to the doors or seat belt of the vehicle, said second electrical circuit being energized during motion of the vehicle to indicate whether or not said brake is applied, any of said doors is open, or the seat belt is on, (c) a third electrical circuit indicative of the water level in the radiator and pressure in the tires, said third electrical circuit being connected to an alarm and to said radiator or the tires and being energized when the ignition switch is turned on to indicate whether or not the water level in the radiator is down or the pressure in any of the tires is low, and (d) each of said electrical circuits including a diode which serves to isolate its respective circuit from the other two circuits.

2. An alarm system as in claim 1 wherein said first electrical system comprises a normally closed magnetic switch which, by the electricity flowing through the circuit, will be activated to the "off" position, and a normally open switch placed under the parking brake which, when the parking brake is down, is pressed into an "on" position.

3. An alarm system as in claim 1 wherein said second electrical circuit comprises a normally closed switch provided under the parking brake which, when the parking brake is down, is pressed into "off" position.

4. An alarm system as in claim 1 which comprises a normally closed switch which is opened when the water level in the radiator falls below a predetermined level.

* * * * *